Dec. 4, 1962 J. W. KENNEDY 3,067,325
STREET AND SIDEWALK LIGHTING MEANS
Filed Dec. 31, 1959
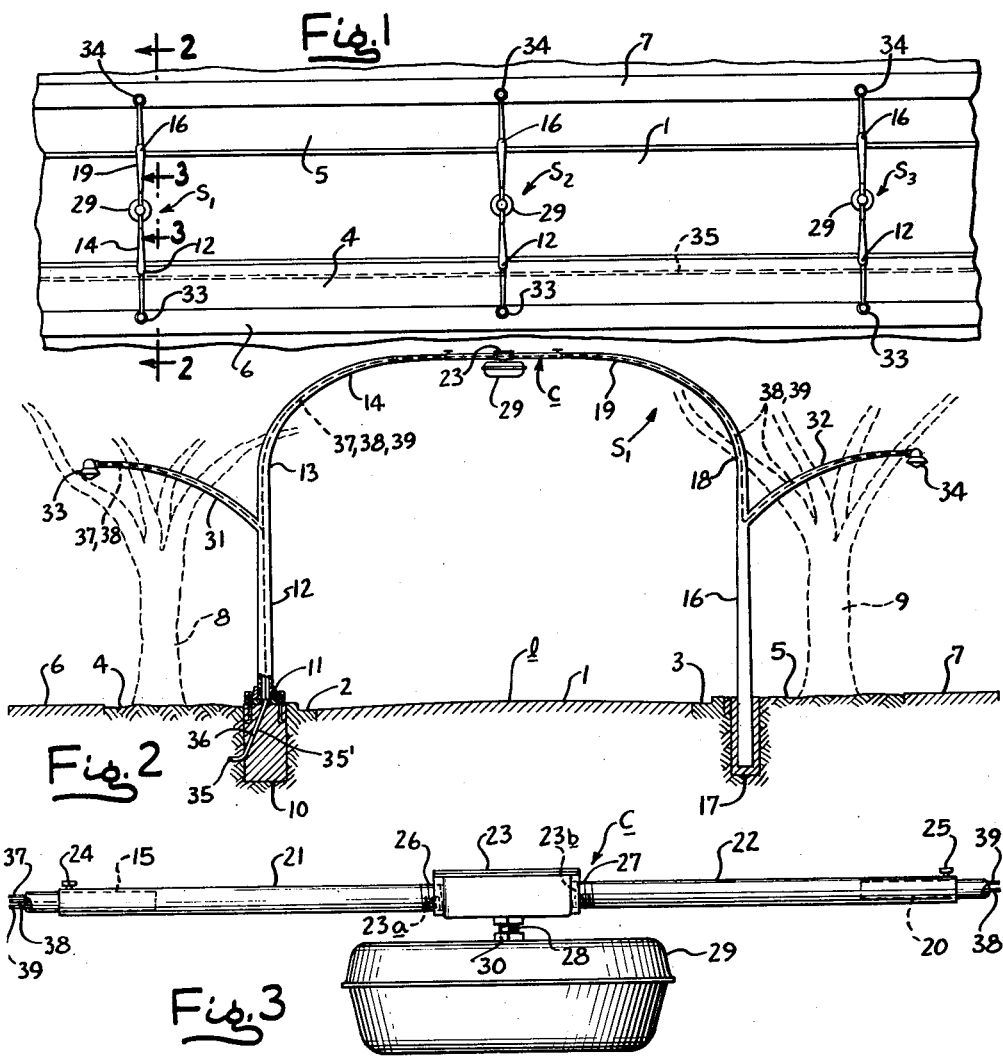
INVENTOR.
JAMES W. KENNEDY
BY
ATTY.

United States Patent Office 3,067,325
Patented Dec. 4, 1962

3,067,325
STREET AND SIDEWALK LIGHTING MEANS
James W. Kennedy, 5736 N. Virginia Ave.,
Chicago, Ill.
Filed Dec. 31, 1959, Ser. No. 863,276
4 Claims. (Cl. 240—25)

This invention relates to lighting systems, and more particularly to improvements in a street and sidewalk lighting system.

It is a common practice today for many municipalities to install street lighting or modernize existing street lighting systems by the use of high intensity fluorescent or arc lamps. In order to obtain an effective placement of these lamps, it is customary to install adjacent to one side of the roadway spaced poles, or masts, which have mast arms thereon extending outwardly toward the center of the roadway, and the lamps are mounted on the outer ends of the mast arms. Usually, power for the lamps is supplied by means of an underground cable which runs along one side of the roadway. Lamps supported on masts which are on one side of the street only are frequently satisfactory to illuminate narrow roadways or side streets, but are often inadequate for wide roadways such as boulevards and the like which carry a large volume of traffic. Therefore, a second set of masts with lamps thereon must be placed on the other side of the roadway, thus requiring an additional underground cable on that side of the roadway.

In many areas of the city there are sidewalks or walkways on either side of the roadway with a parkway separating the sidewalks from the roadway. Moreover, trees are frequently planted on the parkway. In such case the lamps overlying the roadway do not provide adequate illumination for the sidewalk since the trees are between the lamps and sidewalks and, therefore, the trees tend to obscure light and cause excessive shadowing on the sidewalks. During the summer months when the foliage on the trees is fullest, this shadowing becomes particularly objectionable.

It is, therefore, a principal object of the present invention to provide a street lighting system which constitutes an improvement over existing lighting systems in that it is capable of adequately illuminating both the roadway and the sidewalks adjacent thereto, and in areas wherein trees are located between the sidewalks and roadway provides lighting of the sidewalks without substantial shadowing from the trees.

It is a further object of the present invention to provide a lighting system of the type stated which can be easily constructed and installed by a method which consists of modifying certain types of existing lighting systems and utilizing some of the components of the existing lighting systems as part of the improved lighting system of the present invention.

It is also an object of the present invention to provide a lighting system of the type stated in which certain types of lighting systems having an underground cable along one side of the roadway can be modified to form the lighting system of the present invention without the necessity of performing any further underground cable work.

The attainment of the above and further objects of the present invention will be apparent from the following specification taken in conjunction with the accompanying drawing forming a part thereof.

In the drawing:

FIG. 1 is a top plan view of a street provided with a lighting system constructed in accordance with and embodying the present invention;

FIG. 2 is a sectional view taken along line 2—2 of FIG. 1; and

FIG. 3 is an elevational view on an enlarged scale as seen from line 3—3 of FIG. 1 and showing the overhead coupling and roadway lamp which form part of the present invention.

Like reference numerals designate like parts throughout the drawings.

Referring now in more detail by reference characters to the drawing which illustrates a preferred embodiment of the present invention, 1 designates a typical roadway which is bounded on either side by curbs 2, 3 the curbs 2, 3 having adjacent thereto parkways 4, 5. Adjacent to the parkways 4, 5 are walkways or sidewalks 6, 7, and, as is frequently the case, trees 8, 9 are planted on the parkways 4, 5. A series of light-supporting structures $S_1$, $S_2$, $S_3$ are spaced from one another along the roadway 1 as shown in FIG. 1. One of such structures $S_1$ is shown more fully in FIGS. 2 and 3.

Embedded in the parkway 4 and adjacent to the curb 2 is a concrete base 10 having a collar 11 anchored or otherwise rigidly secured to the top thereof at approximately or somewhat above the grade level of the parkway 4. Threaded, clamped or otherwise rigidly secured to the collar 11 is a hollow tubular upstanding mast 12 which may be fabricated of steel or aluminum pipe. The mast 12 terminates at its upper end 13 in a hollow primary mast arm 14, the latter projecting as a cantilever from the mast 12 and extending outwardly towards the center of the roadway 1 and terminating in an open end 15 which extends at right angles to the mast 12. The end 15 is, furthermore located intermediate the center line $l$ of the roadway 1 and the vertical axis of mast 12. Directly across the roadway 1 from the mast 12 is a second hollow upstanding mast 16 which may be of a material similar to the mast 12, and the mast 16 is embedded in the parkway 5 adjacent to the curb 3. Surrounding the mast 16 at the part thereof which is underground are limestone screenings 17 which are hardened to form a thick cementitious coating around the base of the mast 16 to support the latter firmly in place. The upper end 18 of the mast 16 terminates in a hollow primary mast arm 19 which extends outwardly towards the primary mast arm 14 and has a free end 20 spaced from and in alignment with the free end 15.

Joining the two ends 15, 20 is a rigid adaptor or coupling C which consists of two sections of rigid metallic tubing or piping 21, 22 and a junction box 23. One end of each of the pipes 21, 22 telescopically receives the free ends 15, 20 and is secured to said free ends 15, 20 by means of set screws 24, 25 which are threaded into the pipes 21, 22. The other ends of the pipes 21, 22 are formed with threads 26, 27 and are threaded into aligned openings 23a, 23b on opposite sides of the junction box 23. A nipple 28 is also threaded into the junction box 23 and extends downwardly therefrom for supporting a depending lamp fixture 29 which may be any conventional type of street lighting fixture. A lock washer 30 secures the fixture 29 rigidly in place on the nipple 28. The primary mast arms 14, 19 and coupling $c$ will, therefor, form a continuous rigid overhead span from one side of the roadway to the other and will be at a height sufficient for clearance of vehicular traffic. For this purpose, it is preferable that the lowermost edge of the fixture 29 be approximately twenty feet above the roadway.

Also mounted on the masts 12, 16 downwardly from the upper ends 13, 18 thereof are hollow secondary or sidewalk mast arms 31, 32 which may be of the same material as that of the mast 12, 16. These mast arms 31, 32 project toward the walkways 6, 7 terminating in free ends which support lighting fixtures 33, 34. The secondary mast arms 31, 32 are each of such length as to place the fixtures 33, 34 approximately between the trees 8, 9 and sidewalks 6, 7 and at a height above the sidewalk sufficient for clearance of pedestrian traffic. For instance, a height of fourteen feet has been found satisfactory for the present invention. The mast arms 31, 32 may be welded or otherwise rigidly secured to the mast 12, 16 so that the interior of the mast arms 31, 32 communicate with the interiors of the masts 12, 16.

For purposes of supplying current to the lamps in the fixtures 29, 33, 34 an underground cable 35 is embedded in one of the parkways 4 and the cable 35 extends substantially parallel to the roadway 1 as shown in FIG. 1. The concrete base 10 of each structure $S_1$, $S_2$, $S_3$ is formed with a passageway 36 for receiving a branch cable 35', and the branch cable 35' extends upwardly through the mast 12. Conductors from the branch cable 35' extend through the mast arm 31 for connection with the fixture 33. The branch cable 35' also extends through the primary mast arms 14, 19 and secondary mast arm 32 for connection with the fixtures 29, 34. The several fixtures 33, 29, 34 may all be parallel-connected to a single circuit, or, in the vent a three wire electrical system is used, two of conductors 37, 38 may be connected to the fixture 29 while two conductors 38, 39 may be connected to the fixture 34, it being understood that conductor 38 is the neutral or grounded wire.

The lighting system of the present invention provides adequate illumination for both the roadway 1 and the sidewalks 6, 7. The fixture 29 being located somewhat centrally of the roadway 1 provides good illumination of the roadway 1 while the mast arms 31, 32 support the fixture 33, 34 inside the tree line and thereby lessen the effect of shadowing due to the foliage and branches of the trees 8, 9. Since the shadowing effect of the trees becomes particularly objectionable during the summer months when there is the greatest amount of foliage upon the trees, the location of the fixtures 33, 34 inside the tree line and substantially directly above the sidewalks 6, 7, provides an intensity of illumination for the sidewalks 6, 7 otherwise not obtainable from the fixtures 29. The lighting system of the present invention also permits that the cable 35 be on one side of the roadway only since the branch cable is aerial fed for connection to the fixture 29, 33, 34. This eliminates the necessity of costly underground cable work on the other side of the roadway. The mast 16 requires no special concrete supporting base of the type used to support the mast 12, since the hardened limestone screenings together with the support provided by the rigid coupling of the mast arms 14, 19 holds the masts 16, 19 in place. Also in the installation of the lighting system the spacing between the mast 16, 19 need not be precisely predetermined since any variation thereof resulting in corresponding variations in the spacing of the free ends will be compensated by the telescopic fit between the ends 15, 20 and coupling c.

One important feature of the lighting system of the present invention resides in the fact that many types of existing lighting systems can be modified making use of certain of the components therein as part of the lighting system of this invention. For instance, many of these street lighting systems consist of the concrete base 10, upstanding mast 12 and mast arm 14, together with a lamp mounted on the outer end 15 of the mast arm 14. The underground cable 35 supplies the power for the fixture mounted at the end 15. To modify the lighting system of this type of fixture at the end 15 is removed but the cable conductors which supply power for that fixture are left in place. The mast 16 may be prefabricated with the mast arm 32 thereon and a two conductor branch cable may be passed through the mast arms 19 and 32. A hole of somewhat larger diameter than that of the mast 16 is dug in the parkway 5 adjacent to the curb 3 whereupon the mast 16 is mounted in place and the hole is filled with the limestone screenings 17 which are adequately moistened so that when they harden they will form a solid cementitious mass. The two sections of pipe 21, 22 are then telescoped over the ends 15, 20 with the cable conductors being within the pipes 21, 22 and extending completely therethrough. Pipes 21, 22 are then threaded into the openings 23a, 23b in the junction box 23 whereupon the fixture 29 may be mounted on the junction box 23 and the conductors connected together within the junction box. The mast arm 12 may be suitably cut to form an opening over which the mast arm 31 is mounted and the latter may be welded to the mast 12 and, if necessary, braced in place. However, prior to mounting the mast arm 31 on the mast 12 the branch cable within the mast 12 may be tapped and a branch cable brought outwardly through the opening thus formed so that this branch cable can be threaded through the mast arm 31 for connection with the fixture 33. The fixtures 33, 34 may be mounted in place and connected to the conductors.

From the foregoing it will be apparent that the mast 12 with its arm 14 and supporting base 10 are retained as part of the improved lighting system. Moreover, there is no need to disturb the underground cable 35 nor to install a cable on the opposite side of the roadway 1. Similarly, if a cable has been previously installed on said opposite side of the roadway, it need not be disturbed since its use is not required for the present invention. The aerial fed branch cables are concealed within the masts and several mast arms and are, therefore, unlikely to become damaged or frayed.

While I have herein spoken of the line 35 as being an underground cable, it is within the purview of the present invention for the line 35 to be overhead, as is customary in many installations. When the cable 35 is located overhead there is provided a cable on only one side of the street and, in the overhead type of cable installations, it is customary to support the overhead cable from the poles or masts 12 themselves by the use of suitable installators. When an overhead cable is used it is customary to extend electrical connections from the overhead cable into the mast for supplying power to the lamp or lamps supported thereby. The same arrangement that is herein shown would then be used to extend circuit connections at each pair of masts 12, 16, through the coupling c so that both sides of the street would be illuminated while the power source extends along only one side of the street.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and desired to be secured by Letters Patent is:

1. In a street lighting system the combination with two similar light-supporting structures each of which includes an upstanding mast having a tubular mast arm projecting as a cantilever from the end thereof and terminating in an open end the mast arms of the two structures being spaced apart and in alignment with one another and with the open ends thereof facing one another, a rigid adaptor spanning the gap between the arms and mechanically rigidly connecting both of them together to hold them from spreading and forming the two mast arms into one rigid structure with the two masts, said adaptor including means making telescoping connection with at least one of the mast arms to permit variations in the spacing between the two upstanding masts, said adaptor including an electric junction box having aligned openings in line with the respective open ends of the two mast arms, means for supporting the junction box at said openings and connecting said box to said mast arms, and means for supporting a lighting fixture from said junction box.

2. In a street lighting system the combination with sets of two similar light supporting structures, the sets being spaced from one another along the street and the structures of each set being on opposite sides of the street, each of the two similar structures of each set having an upstanding mast having a tubular mast arm projecting as a cantilever from the end thereof and terminating in an open end the mast arms of the two structures being spaced apart and in alignment with one another and with the open ends thereof facing one another, a rigid adaptor spanning the gap between the arms and mechanically rigidly connecting both of them together to hold them from spreading and forming the two mast arms into one rigid structure with the two masts, said adaptor including means making telescoping connection with at least one of the mast arms to permit variations in the spacing between the two upstanding masts, said adaptor including an electric junction box having aligned openings in line with the respective open ends of the two mast arms, means for supporting the junction box at said openings and connecting said box to said mast arms, means for supporting a lighting fixture from said junction box, secondary mast arms mounted on and extending from the respective masts in directions opposite to the first mentioned mast arms, lighting fixtures mounted on the respective secondary mast arms, and electric power wires for the respective lighting fixtures, said wires extending along only one side of the street, and connections to said wires extending from ground level upwardly through one of the masts to and through the secondary mast arm thereof to the lighting fixture on that secondary mast arm and through the first mast arm of said one mast to the junction box and from the junction box through the first mentioned mast arm of the other mast to the secondary mast arm of the other mast.

3. A street lighting system comprising similar lighting units each spanning the street and spaced from one another lengthwise along the street, each unit comprising two light-supporting structures each of which includes an upstanding mast, the masts being on opposite sides of the street, each mast having a tubular mast arm projecting as a cantilever therefrom and terminating in an open end, the mast arms of the two structures being spaced apart and in alignment with one another and with the open ends thereof facing one another, a rigid adaptor spanning the gap between the mast arms and mechanically rigidly connecting them together and forming the two mast arms into one rigid structure with the two masts, said adaptor being connected to at least one of the mast arms in a manner to permit variations in the spacing between the two masts, said adaptor including an electric junction box having openings in communication with the respective open ends of the two mast arms, a lighting fixture supported from the adaptor, hollow tubular secondary mast arms mounted on and extending from the respective masts in directions opposite to the first-mentioned mast arms, a lighting fixture mounted on each of said secondary mast arms, and electric wiring connections extending to each of the upstanding masts on one side of the street and from there to the lighting fixture on the adaptor and to the lighting fixture on the secondary mast arm of said one mast and to the lighting fixture on the secondary mast arm of the other mast of the unit.

4. A street lighting system comprising two light-supporting structures each of which includes an upstanding mast, the masts being on opposite sides of the street, each mast having a tubular mast arm projecting as a cantilever therefrom and terminating in an open end, the mast arms of the two structures being spaced apart and with the open ends thereof facing one another, a rigid adaptor spanning the gap between the mast arms and mechanically rigidly connecting them together and forming the two mast arms into one rigid structure with the two masts, said adaptor being connected to at least one of the mast arms in a manner to permit variations in the spacing between the two masts, a lighting fixture supported from the adaptor, hollow tubular secondary mast arms mounted on and extending from the respective masts in directions opposite to the first-mentioned mast arms, a lighting fixture mounted on each of said secondary mast arms, and electric wiring connections extending to one of the upstanding masts and from there to the lighting fixture on the adaptor and to the lighting fixture on the secondary mast arm of said one mast and to the lighting fixture on the secondary mast arm of the other mast.

References Cited in the file of this patent

UNITED STATES PATENTS

| | | |
|---|---|---|
| 1,085,145 | Massey | Jan. 27, 1914 |
| 1,635,611 | De La Lama | July 12, 1927 |
| 1,665,704 | Kernes | Apr. 10, 1928 |
| 1,719,977 | Horni | July 9, 1929 |
| 2,328,445 | Francis | Aug. 31, 1943 |
| 2,816,214 | Bacon | Dec. 10, 1957 |
| 2,825,796 | Lanmon | Mar. 4, 1958 |